United States Patent [19]

Cook

[11] Patent Number: 4,891,011
[45] Date of Patent: Jan. 2, 1990

[54] SYSTEM FOR ASSISTING THE LEARNING OF A SUBJECT

[76] Inventor: Graham D. Cook, 99 Alden La., Lake Forest, Ill. 60045

[21] Appl. No.: 218,667

[22] Filed: Jul. 13, 1988

[51] Int. Cl.$^4$ ............................................. G09B 19/06
[52] U.S. Cl. ..................................... 434/157; 283/89; 434/331
[58] Field of Search ............... 434/157, 327, 331, 328, 434/344; 283/88, 70, 89

[56] References Cited

U.S. PATENT DOCUMENTS

| | | | |
|---|---|---|---|
| 3,126,647 | 3/1964 | Hazelett | 434/157 |
| 3,327,406 | 6/1967 | Baker | 434/327 |
| 3,359,651 | 12/1967 | Mair | 434/331 |
| 3,471,172 | 10/1969 | Bayha | 283/88 |
| 3,933,094 | 1/1976 | Murphy et al. | 283/88 |
| 4,588,211 | 5/1986 | Greene | 283/70 |
| 4,604,065 | 8/1986 | Frazer et al. | 434/331 |
| 4,627,819 | 12/1986 | Burrows | 283/88 X |

Primary Examiner—William H. Grieb
Attorney, Agent, or Firm—Granger Cook, Jr.

[57] ABSTRACT

A system for assisting the learning of a subject and, more specifically, for the aiding of the teaching of a language. The system comprises a substrate upon which is arranged a first, basic text that contains supplementable information which is unaidedly visible to the eye of a human user. A second, explanatory text, interlinearly arrayed with respect to the first text, provides additional information related to the supplementable information contained in the first text. The second text is arranged so that the additional information is generally proximate to the supplementable information to which it relates. The second text is displayed using a medium which is generally invisible to the eye of a human user unless exposed to light of a specified frequency range, such as ultraviolet (UV) light.

2 Claims, 1 Drawing Sheet

Neko ga teburu no ue ni imasu. —44
The cat is on the table. —42

The sun —66        60
———— is the nearest star to earth. —62
64

SYSTEM FOR ASSISTING THE LEARNING OF A SUBJECT

BACKGROUND OF THE INVENTION

The present invention is directed to a system for assisting the learning of a subject. The system is particularly suited for aiding the teaching of a foreign language.

Printed material which is detectable when exposed to light of a particular frequency has been utilized in a number of different applications. For example, U.S. Pat. No. 4,627,819 to Burrows for a "Teaching Or Amusement Apparatus" discloses a printed substrate having some sections with a greater reflectance of infrared light than other sections. The different sections are printed by a particular method in order to reduce the visually detectable discrimination with the naked eye between the two areas.

U.S. Pat. No. 4,588,211 to Greene for a "Machine Readable Document" discloses a document, such as a check, which is made so as to enable a machine to read specific areas of the document and to scan information contained within those specific areas. The specific areas are defined by the printing of a border or other delineation around a predetermined area in fluorescent or similar ink. The scanning mechanism of Greene is sensitive to light reflected by the special ink and is energized to commence scanning upon encountering such special ink during surveying of the documents.

U.S. Pat. No. 3,933,094 to Murphy for a "Substrate Having Colored Indicia Thereon For Read-out By Infrared Scanning Apparatus" discloses a method for making a business reply envelope, by which method one may print a bar code or other indicia for reading by an infrared scanning apparatus while enabling the printing of the bar code in colors other than black or gray.

U.S. Pat. No. 3,471,172 to Bayha for "Scrip For Use With Paper Security Validation Apparatus" discloses the imprinting of a document, such as scrip, with a particular design using different inks. With the Bayha device some of the inks are designed to enable passage of electromagnetic energy, such as infrared light, while other areas of the scrip are printed with other inks which are designed to impede the passage of such electromagnetic energy. Thus, the Bayha documents may be encoded in a machine-readable form.

U.S. Pat. No. 4,604,065 to Frazer, et al. for a "Teaching Or Amusement Apparatus" discloses an apparatus comprised of a substrate having printed intelligence and spatially distinctive areas on the substrate. The distinctive areas are detectable by a hand-held detector which is held adjacent to the substrate and may be sensitive to any of a various number of parameters, such as differences in capacitance, magnetic reluctance, or light intensity in the infrared range.

Thus, the teaching of the art tends toward utilization of non-visible light or other electromagnetic parameters to accommodate interpretation of a printed document by machine reading of some sort.

SUMMARY OF THE INVENTION

The invention is a system for assisting the learning of a subject and, more specifically, for the aiding of the teaching of a language. The system comprises a substrate upon which is arranged a first, basic text that contains supplementable information which is unaidedly visible to the eye of a human user. A second, explanatory text, interlinearly arrayed with respect to the first text, provides additional information related to the supplementable information contained in the first text. The second text is arranged so that the additional information is generally proximate to the supplementable information to which it relates. The second text is displayed using a medium which is generally invisible to the eye of a human user unless exposed to light of a specified frequency range, such as ultraviolet (UV) light.

The present invention, therefore, is intended to selectively reveal certain printed information for recognition by a human user. Such selectivity of illumination is employed by the system to preclude the human user's unconscious assimilation of explanatory material which defeats the learning of the more difficult supplementable material contained in a basic text and thereby dilutes the effectiveness of the teaching of such difficult supplementable material.

It is therefore an object of this invention to provide a system for assisting the learning of a subject and, more specifically, the learning of a language.

Another object of this invention is to provide a system for assisting the learning of a subject which provides explanatory text associated with a basic text arranged upon a substrate, the explanatory text being visible only upon application of light within a specified frequency range.

It is a further object of this invention to provide a system for assisting the learning of a subject with which conscious action by a user is required in the form of illumination of an explanatory text by light of a specified frequency range to render the explanatory text visible to the user.

Further objects and features of the present invention will be apparent from the following specification and claims when considered in connection with the accompanying drawing illustrating the preferred embodiment of the invention.

DETAILED DESCRIPTION OF THE DRAWING

DETAILED DESCRIPTION OF THE INVENTION

Figures 1, 2, 3:
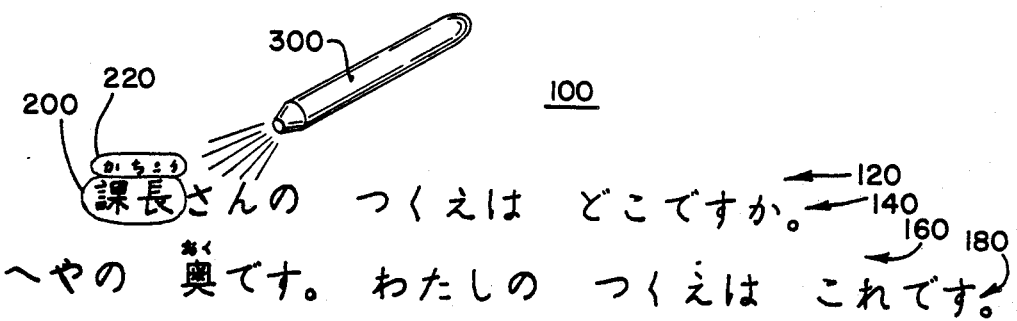
FIG. 1 is an illustration of the preferred embodiment of the present invention.
FIG. 2 is an illustration of an alternate embodiment of the present invention appropriate for assisting the learning of the English language by a user who reads Japanese.
FIG. 3 is an illustration of a second alternate embodiment of the present invention appropriate for a quiz for use in the learning of a subject.

Referring to FIG. 1, the preferred embodiment of the present invention is illustrated employing a representative text 100 amenable to assisting the learning of the Japanese language. The representative text 100 presents Kanji (Chinese characters) at lines 140 and 180 in a first text and presents a second, explanatory text in Furigana at lines 120 and 160. Furigana is a form of pronunciation letters recognized as pronunciation aids in the learning of the more difficult Kanji characters.

Thus, for example, the Kanji figures at 200 in line 180 are explained in the simpler Furigana text by the figures indicated by reference numeral 220 in line 160.

Such a parallel presentation of Kanji and associated explanatory Furigana text material is a common method of presentation of Kanji instructional materials intended to impart a knowledge of Kanji to a reader. A common shortcoming of such a presentation of difficult material and associated explanatory material is that, while a reader may be reading the Kanji figures in line 180, when the reader encounters the Kanji figures at, say, 200 and is unfamiliar with those Kanji figures, the reader's eyes will likely unconsciously stray to the Furigana explanatory text at 220 to expediently allow the reader to proceed with reading of the text at line 180. In such a situation, the instructional value of the explanatory Furigana figures at 220 is diluted, because the reader unconsciously reads the Furigana figures at 220 rather than being "forced" to read and learn the Kanji figures at 200.

Accordingly, the Furigana figures at lines 120 and 160 are printed with inks rendered visible only by light of a particular frequency, such as ultraviolet (UV) light. The system contemplated includes, in its preferred embodiment, a portable UV light 300 or similar illumination device.

In practical applications for the system of the present invention, the media for presentation of the textual material may include books, cards, individual sheets, pamphlets booklets, or the like.

The pen contemplated for inclusion with the system of the present invention preferably comprises any portable light source capable of producing light of the specific frequency range desired.

In use, a reader would be presented with unaidedly visible Kanj figures with no distracting explanatory Furigana figures visible. As the reader proceeds to read the Kanji figures, without any temptation to resort to more easily understood Furigana figures, should he encounter Kanji figures for which he knows no meaning he can employ the UV light 300 to illuminate the appropriate Furigana explanatory text to gain the benefit of that explanatory text, turn off the UV light 300, and then proceed with the reading of the Kanji figures in the remainder of the line, as at line 180.

Thus, the system of the present invention provides for preclusion of inadvertent exposure and assimilation of explanatory material. The system requires that a user consciously take action to learn the contents of the explanatory material; in such manner a disciplined user is provided a greater opportunity for learning the more difficult Kanji figures by having the opportunity to ponder those figures and attempt to remember their meaning—before rendering the explanatory Furigana figures visible to ascertain the more easily understood material contained in the explanatory text.

While the example given illustrates the employment of the system of the present invention as a system for learning Kanji characters, certainly any subject amenable to explanatory text could likewise employ the system of the present invention. Other foreign languages, mathematical derivations, self-administered tests, and the like are all amenable to employment of the system of the present invention.

FIG. 2, for example, illustrates an alternate embodiment of the present invention to assist in the learning of English by a user who reads Japanese. In FIG. 2, a representative text 40 has a first text 42 in English and a second text 44 in Japanese. The first text 42 is printed with materials which allow the first text 42 to be visible to a human user without any special illumination. The second text 44 is an explanatory text presenting the Japanese equivalent of the first text 42. The second text 44 is printed with materials which require illumination by light of a specified frequency to be visible to a human user.

Thus, employing the representative text 40 of FIG. 2 with the present invention, a user may read the first text 42 in English and, only after illumination with appropriate light, may view the second text 44 to ascertain the Japanese translation of the expression presented by the first text 42.

Referring to FIG. 3, a second alternate embodiment of the present invention is illustrated showing employment of the present invention for a quiz format. In FIG. 3, the representative text 60 includes a first text 62 which is a query text consisting of a fill-in-the-blank type of quiz question. Arranged above the first text 62 in proximity with the blank 64 is a second text 66 which is a responsive text that presents the correct term for entry in the blank 64 for completing the statement presented by first text 62 as a true statement.

The second text 66 is printed with materials which require illumination by light of a specified frequency to be visible to a human user. The first text 62 is unaidedly visible to a human user.

In use, a user would have an opportunity to ponder the question posed by the first text 62 before learning the proper answer. In order to learn the proper answer, the user must illuminate the second text 66 with appropriate light to render the second text 66 visible.

It is to be understood that, while the detailed drawing and specific example given describe a preferred embodiment of the invention, it is for the purpose of illustration only, that the invention is not limited to the precise details and conditions disclosed and that various changes may be made therein without departing from the spirit of the invention which is defined by the following claims.

I claim:

1. A system for aiding the teaching of a language to a human being comprising a substrate with first and second sides; a first text displayed upon said first side of said substrate, said first text being visible to said human being; a second text also displayed upon said first side of said substrate, said second text being invisible to said human being; and a portable light source for providing light in a nonvisible frequency range in a select, small area on said substrate to render a portion of said second text visible to said human being; said second text being related to said first text; portions of said first text, and of said second text being arrayed in substantially adjacent lines; portions of said second text being selectively visible only where illuminated by said light source.

2. A system for aiding the teaching of a language to a human being comprising a substrate with first and second sides, a first text displayed upon said first side of said substrate; said first text being visible to said human being, a second text also displayed upon said first side of said substrate, said second text being invisible to said human being, portions of which are adapted to be rendered visible in response to light of a specified frequency range, said second text being related to said first text, portions of said first text and of said second text having related meanings being arranged in an alternating interlineal array, said second text being rendered selectively visible only when illuminated by light of said specified frequency range.

* * * * *